US011107238B2

(12) United States Patent
Braunstain et al.

(10) Patent No.: US 11,107,238 B2
(45) Date of Patent: Aug. 31, 2021

(54) METHOD, SYSTEM AND APPARATUS FOR DETECTING ITEM FACINGS

(71) Applicant: ZEBRA TECHNOLOGIES CORPORATION, Lincolnshire, IL (US)

(72) Inventors: Eyal Braunstain, Oakville (CA); Michael A. Greenspan, Kingston (CA); Joseph Lam, North York (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/713,508

(22) Filed: Dec. 13, 2019

(65) Prior Publication Data

US 2021/0183095 A1   Jun. 17, 2021

(51) Int. Cl.
*G06T 7/73* (2017.01)
*G06T 7/521* (2017.01)
*G06K 9/00* (2006.01)

(52) U.S. Cl.
CPC ............ *G06T 7/73* (2017.01); *G06K 9/00671* (2013.01); *G06T 7/521* (2017.01); *G06T 2207/10028* (2013.01); *G06T 2207/30242* (2013.01)

(58) Field of Classification Search
CPC .. G06T 7/73; G06T 7/521; G06T 7/74; G06T 7/0004; G06T 7/11; G06T 7/60; G06T 7/70; G06T 7/75; G06T 7/90; G06T 2207/30242; G06T 2207/10028; G06K 9/00671; G06K 9/00771; G06K 9/3233; G06K 9/4604; G06K 9/4671; G06K 9/6267; G06K 9/46; G06K 9/6201; G06K 9/6211;
(Continued)

(56) References Cited

U.S. PATENT DOCUMENTS

| 5,209,712 A | 5/1993 | Ferri |
| 5,214,615 A | 5/1993 | Bauer |
| 5,408,322 A | 4/1995 | Hsu et al. |

(Continued)

FOREIGN PATENT DOCUMENTS

| CA | 2835830 | 11/2012 |
| CA | 3028156 | 1/2018 |

(Continued)

OTHER PUBLICATIONS

"Using image analytics to monitor retail store shelves"; M. Marder, IBM Journal of Research and Development (vol. 59, Issue: 2/3, pp. 3:1-3:11) (Year: 2015).*

(Continued)

*Primary Examiner* — Michael S Osinski

(57) ABSTRACT

A method by an imaging controller of detecting item facings from image sensor data includes: obtaining, at the imaging controller, the image sensor data corresponding to a support structure containing at least one item; identifying, by a feature detector of the imaging controller, a set of matched keypoint pairs from keypoints of the image sensor data; determining, by a peak detector of the imaging controller, a separation distance between the keypoints of each matched keypoint pair; detecting, by the peak detector, a count of item instances represented in the image sensor data based on the separation distances; and presenting item facing detection output including the count of item instances.

20 Claims, 11 Drawing Sheets

(58) Field of Classification Search
CPC ............ G06K 9/6218; G06K 9/00201; G06Q 10/087; G06Q 20/201
See application file for complete search history.

(56) References Cited

U.S. PATENT DOCUMENTS

| | | | |
|---|---|---|---|
| 5,414,268 A | 5/1995 | McGee |
| 5,534,762 A | 7/1996 | Kim |
| 5,566,280 A | 10/1996 | Fukui et al. |
| 5,704,049 A | 12/1997 | Briechle |
| 5,953,055 A | 9/1999 | Huang et al. |
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,723 B1 | 4/2004 | Gibson et al. |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 | 5/2012 | Opalach et al. |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,260,742 B2 | 9/2012 | Cognigni et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,571,314 B2 | 10/2013 | Tao et al. |
| 8,599,303 B2 | 12/2013 | Stettner |
| 8,630,924 B2 | 1/2014 | Groenevelt et al. |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,015,072 B2 * | 4/2015 | Wu ..................... G06Q 10/087 705/28 |
| 9,037,287 B1 | 5/2015 | Grauberger et al. |
| 9,064,394 B1 | 6/2015 | Trundle |
| 9,070,285 B1 | 6/2015 | Ramu et al. |
| 9,072,929 B1 | 7/2015 | Rush et al. |
| 9,120,622 B1 | 9/2015 | Elazary et al. |
| 9,129,277 B2 | 9/2015 | Macintosh |
| 9,135,491 B2 | 9/2015 | Morandi et al. |
| 9,159,047 B2 | 10/2015 | Winkel |
| 9,171,442 B2 | 10/2015 | Clements |
| 9,247,211 B2 | 1/2016 | Zhang et al. |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,443,164 B2 * | 9/2016 | Sulc ..................... G06K 9/4633 |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,589,353 B2 | 3/2017 | Mueller-Fischer et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,779,205 B2 | 10/2017 | Namir |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,953,420 B2 | 4/2018 | Wolski et al. |
| 9,980,009 B2 | 5/2018 | Jiang et al. |
| 9,984,451 B2 * | 5/2018 | Gormish ................ G06K 9/52 |
| 9,994,339 B2 | 6/2018 | Colson et al. |
| 9,996,818 B1 | 6/2018 | Ren et al. |
| 10,019,803 B2 | 7/2018 | Venable et al. |
| 10,111,646 B2 | 10/2018 | Nycz et al. |
| 10,121,072 B1 | 11/2018 | Kekatpure |
| 10,127,438 B1 | 11/2018 | Fisher et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,262,294 B1 | 4/2019 | Hahn et al. |
| 10,265,871 B2 | 4/2019 | Hance et al. |
| 10,289,990 B2 * | 5/2019 | Rizzolo ................ G06Q 20/201 |
| 10,336,543 B1 | 7/2019 | Sills et al. |
| 10,349,031 B2 | 7/2019 | DeLuca |
| 10,352,689 B2 | 7/2019 | Brown et al. |
| 10,373,116 B2 | 8/2019 | Medina et al. |
| 10,394,244 B2 | 8/2019 | Song et al. |
| 10,453,046 B2 * | 10/2019 | Wu .......................... G06T 7/74 |
| 10,565,548 B2 * | 2/2020 | Skaff ................... G06K 9/3216 |
| 10,769,582 B2 * | 9/2020 | Williams ........... G06K 9/00771 |
| 2001/0031069 A1 | 10/2001 | Kondo et al. |
| 2001/0041948 A1 | 11/2001 | Ross et al. |
| 2002/0006231 A1 | 1/2002 | Jayant et al. |
| 2002/0059202 A1 | 5/2002 | Hadzikadic et al. |
| 2002/0097439 A1 | 7/2002 | Braica |
| 2002/0146170 A1 | 10/2002 | Rom |

(56) References Cited

U.S. PATENT DOCUMENTS

| | | |
|---|---|---|
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 | 5/2003 | Blanford et al. |
| 2003/0174891 A1 | 9/2003 | Wenzel et al. |
| 2004/0021313 A1 | 2/2004 | Gardner et al. |
| 2004/0084527 A1 | 5/2004 | Bong et al. |
| 2004/0131278 A1 | 7/2004 | imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0174351 A1 | 8/2005 | Chang |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0279527 A1 | 12/2006 | Zehner et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 | 1/2008 | Fujiwara |
| 2008/0025565 A1 | 1/2008 | Zhang et al. |
| 2008/0027591 A1 | 1/2008 | Lenser et al. |
| 2008/0077511 A1* | 3/2008 | Zimmerman .......... G06Q 10/00 705/28 |
| 2008/0159634 A1 | 7/2008 | Sharma et al. |
| 2008/0164310 A1 | 7/2008 | Dupuy et al. |
| 2008/0175513 A1 | 7/2008 | Lai et al. |
| 2008/0181529 A1 | 7/2008 | Michel et al. |
| 2008/0183730 A1 | 7/2008 | Enga |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1 | 3/2009 | Linaker et al. |
| 2009/0063306 A1 | 3/2009 | Fano et al. |
| 2009/0063307 A1* | 3/2009 | Groenovelt .......... G06Q 10/087 705/28 |
| 2009/0074303 A1 | 3/2009 | Filimonova et al. |
| 2009/0088975 A1 | 4/2009 | Sato et al. |
| 2009/0094140 A1* | 4/2009 | Kwan ................ G06Q 10/087 705/28 |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1* | 7/2009 | Hicks ................... G06F 3/0317 705/28 |
| 2009/0206161 A1 | 8/2009 | Olmstead |
| 2009/0236155 A1 | 9/2009 | Skaff |
| 2009/0252437 A1 | 10/2009 | Li et al. |
| 2009/0287587 A1 | 11/2009 | Bloebaum et al. |
| 2009/0323121 A1 | 12/2009 | Valkenburg et al. |
| 2010/0017407 A1 | 1/2010 | Beniyama et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0161569 A1 | 6/2010 | Schreter |
| 2010/0171826 A1 | 7/2010 | Hamilton et al. |
| 2010/0208039 A1 | 8/2010 | Setettner |
| 2010/0214873 A1 | 8/2010 | Somasundaram et al. |
| 2010/0235033 A1 | 9/2010 | Yamamoto et al. |
| 2010/0241289 A1 | 9/2010 | Sandberg |
| 2010/0257149 A1 | 10/2010 | Cognigni et al. |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0216063 A1 | 9/2011 | Hayes |
| 2011/0242286 A1 | 10/2011 | Pace et al. |
| 2011/0246503 A1 | 10/2011 | Bender et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0017028 A1 | 1/2012 | Tsirkin |
| 2012/0019393 A1 | 1/2012 | Wolinsky et al. |
| 2012/0022913 A1 | 1/2012 | Volkmann et al. |
| 2012/0051730 A1 | 3/2012 | Cote et al. |
| 2012/0069051 A1 | 3/2012 | Hagbi et al. |
| 2012/0075342 A1 | 3/2012 | Choubassi et al. |
| 2012/0133639 A1 | 5/2012 | Kopf et al. |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1 | 8/2012 | Newcombe et al. |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0307108 A1 | 12/2012 | Forutanpour |
| 2012/0308123 A1* | 12/2012 | Jo ........................ G06T 7/254 382/159 |
| 2012/0323620 A1* | 12/2012 | Hofman ................ G06K 9/62 705/7.11 |
| 2013/0030700 A1 | 1/2013 | Miller et al. |
| 2013/0076586 A1 | 3/2013 | Karhuketo et al. |
| 2013/0090881 A1 | 4/2013 | Janardhanan et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1 | 6/2013 | Silver et al. |
| 2013/0144565 A1 | 6/2013 | Miller et al. |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahern et al. |
| 2013/0232039 A1 | 9/2013 | Jackson et al. |
| 2013/0235165 A1 | 9/2013 | Gharib et al. |
| 2013/0235206 A1 | 9/2013 | Smith et al. |
| 2013/0236089 A1 | 9/2013 | Litvak et al. |
| 2013/0278631 A1 | 10/2013 | Border et al. |
| 2013/0279751 A1* | 10/2013 | Bruna ................. G06K 9/6228 382/103 |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalakrishnan et al. |
| 2014/0003727 A1 | 1/2014 | Lortz et al. |
| 2014/0006229 A1 | 1/2014 | Birch et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0025420 A1* | 1/2014 | Joshi .................... G06Q 10/08 705/7.23 |
| 2014/0028837 A1 | 1/2014 | Gao et al. |

(56) References Cited

U.S. PATENT DOCUMENTS

| | | |
|---|---|---|
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Showering |
| 2014/0104413 A1 | 4/2014 | McCloskey et al. |
| 2014/0129027 A1 | 5/2014 | Schnittman |
| 2014/0156133 A1 | 6/2014 | Cullinane et al. |
| 2014/0161359 A1 | 6/2014 | Magri et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0214600 A1 | 7/2014 | Argue et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0279294 A1 | 9/2014 | Field-Darragh et al. |
| 2014/0300637 A1 | 10/2014 | Fan et al. |
| 2014/0316875 A1 | 10/2014 | Tkachenko et al. |
| 2014/0330835 A1 | 11/2014 | Boyer |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0032304 A1 | 1/2015 | Nakamura et al. |
| 2015/0039458 A1 | 2/2015 | Reid |
| 2015/0052027 A1* | 2/2015 | Pavani ................. G06K 9/6201 705/28 |
| 2015/0088618 A1 | 3/2015 | Basir et al. |
| 2015/0088701 A1 | 3/2015 | Desmarais et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1* | 4/2015 | Patel ................. G06Q 10/087 382/199 |
| 2015/0139010 A1 | 5/2015 | Jeong et al. |
| 2015/0146989 A1* | 5/2015 | Shiiyama ............. G06K 9/4676 382/197 |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0193909 A1* | 7/2015 | Maayan ............. H04N 5/23238 345/648 |
| 2015/0212521 A1 | 7/2015 | Pack et al. |
| 2015/0235157 A1 | 8/2015 | Avegliano et al. |
| 2015/0245358 A1 | 8/2015 | Schmidt |
| 2015/0248592 A1* | 9/2015 | Wang ................. G06F 16/583 382/201 |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0310601 A1 | 10/2015 | Rodriguez et al. |
| 2015/0332368 A1 | 11/2015 | Vartiainen et al. |
| 2015/0352721 A1 | 12/2015 | Wicks et al. |
| 2015/0363625 A1 | 12/2015 | Wu et al. |
| 2015/0363758 A1 | 12/2015 | Wu et al. |
| 2015/0365660 A1 | 12/2015 | Wu et al. |
| 2015/0379704 A1 | 12/2015 | Chandrasekar et al. |
| 2016/0012588 A1 | 1/2016 | Taguchi et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0119540 A1* | 4/2016 | Wu ................. G06Q 10/087 348/38 |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1 | 6/2016 | Schwartz |
| 2016/0171429 A1* | 6/2016 | Schwartz ................. G06T 7/90 382/103 |
| 2016/0171707 A1 | 6/2016 | Schwartz |
| 2016/0180533 A1* | 6/2016 | Pavani ................. G06K 9/3233 382/103 |
| 2016/0185347 A1 | 6/2016 | Lefevre et al. |
| 2016/0191759 A1 | 6/2016 | Somanath et al. |
| 2016/0224927 A1 | 8/2016 | Pettersson |
| 2016/0253735 A1 | 9/2016 | Scudillo et al. |
| 2016/0253844 A1 | 9/2016 | Petrovskaya et al. |
| 2016/0260054 A1 | 9/2016 | High et al. |
| 2016/0271795 A1 | 9/2016 | Vicenti |
| 2016/0313133 A1 | 10/2016 | Zeng et al. |
| 2016/0328618 A1 | 11/2016 | Patel et al. |
| 2016/0328767 A1 | 11/2016 | Bonner et al. |
| 2016/0353099 A1 | 12/2016 | Thomson et al. |
| 2016/0364634 A1 | 12/2016 | Davis et al. |
| 2016/0379083 A1* | 12/2016 | Sala ................. G06T 7/75 345/633 |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1* | 2/2017 | Rizzolo ................. G06K 9/183 |
| 2017/0041553 A1 | 2/2017 | Cao et al. |
| 2017/0054965 A1 | 2/2017 | Raab et al. |
| 2017/0061416 A1* | 3/2017 | Morate ................. G06F 16/51 |
| 2017/0066459 A1 | 3/2017 | Singh |
| 2017/0074659 A1 | 3/2017 | Giurgiu et al. |
| 2017/0109940 A1 | 4/2017 | Guo et al. |
| 2017/0147966 A1 | 5/2017 | Aversa et al. |
| 2017/0150129 A1 | 5/2017 | Pangrazio |
| 2017/0177969 A1* | 6/2017 | Zaremski ............. G06K 9/4604 |
| 2017/0178060 A1 | 6/2017 | Schwartz |
| 2017/0178227 A1 | 6/2017 | Gornish |
| 2017/0178310 A1 | 6/2017 | Gornish |
| 2017/0193434 A1* | 7/2017 | Shah ................. G06K 9/00664 |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Baik |
| 2017/0228885 A1 | 8/2017 | Baumgartner |
| 2017/0261993 A1 | 9/2017 | Venable et al. |
| 2017/0262724 A1* | 9/2017 | Wu ................. G06T 7/0004 |
| 2017/0280125 A1 | 9/2017 | Brown et al. |
| 2017/0286773 A1 | 10/2017 | Skaff et al. |
| 2017/0286901 A1 | 10/2017 | Skaff et al. |
| 2017/0323253 A1 | 11/2017 | Enssle et al. |
| 2017/0323376 A1 | 11/2017 | Glaser et al. |
| 2017/0337508 A1 | 11/2017 | Bogolea et al. |
| 2017/0358089 A1* | 12/2017 | Miyazato ............. G06K 9/00805 |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0075403 A1 | 3/2018 | Mascorro Medina et al. |
| 2018/0089613 A1 | 3/2018 | Chen et al. |
| 2018/0096555 A1* | 4/2018 | Schtein ................. G06K 9/6211 |
| 2018/0101813 A1* | 4/2018 | Paat ................. H04N 7/185 |
| 2018/0108134 A1* | 4/2018 | Venable ................. G06T 7/521 |
| 2018/0114183 A1 | 4/2018 | Howell |
| 2018/0130011 A1 | 5/2018 | Jacobsson |
| 2018/0143003 A1 | 5/2018 | Clayton et al. |
| 2018/0174325 A1 | 6/2018 | Fu et al. |
| 2018/0190160 A1 | 7/2018 | Bryan et al. |
| 2018/0201423 A1 | 7/2018 | Drzewiecki et al. |
| 2018/0204111 A1 | 7/2018 | Zadeh et al. |
| 2018/0251253 A1 | 9/2018 | Taira et al. |
| 2018/0260772 A1* | 9/2018 | Chaubard ............. G06T 7/0008 |
| 2018/0276596 A1 | 9/2018 | Murthy et al. |
| 2018/0281191 A1 | 10/2018 | Sinyavskiy et al. |

(56) References Cited

U.S. PATENT DOCUMENTS

| | | | |
|---|---|---|---|
| 2018/0293442 A1 | 10/2018 | Fridental et al. | |
| 2018/0293543 A1 | 10/2018 | Tiwari | |
| 2018/0306958 A1 | 10/2018 | Goss et al. | |
| 2018/0313956 A1 | 11/2018 | Rzeszutek et al. | |
| 2018/0314260 A1 | 11/2018 | Jen et al. | |
| 2018/0314908 A1 | 11/2018 | Lam | |
| 2018/0315007 A1 | 11/2018 | Kingsford et al. | |
| 2018/0315065 A1 | 11/2018 | Zhang et al. | |
| 2018/0315173 A1 | 11/2018 | Phan et al. | |
| 2018/0315865 A1 | 11/2018 | Haist et al. | |
| 2018/0330175 A1* | 11/2018 | Corcoran | H04N 7/181 |
| 2018/0370727 A1 | 12/2018 | Hance et al. | |
| 2019/0019030 A1* | 1/2019 | Cansizoglu | G06T 7/75 |
| 2019/0019293 A1* | 1/2019 | Woodroffe | G06Q 10/087 |
| 2019/0034864 A1* | 1/2019 | Skaff | G06K 7/1413 |
| 2019/0057588 A1* | 2/2019 | Savvides | G06K 9/00771 |
| 2019/0065861 A1 | 2/2019 | Savvides et al. | |
| 2019/0073554 A1 | 3/2019 | Rzeszutek | |
| 2019/0073559 A1 | 3/2019 | Rzeszutek et al. | |
| 2019/0073627 A1 | 3/2019 | Nakdimon et al. | |
| 2019/0077015 A1 | 3/2019 | Shibasaki et al. | |
| 2019/0087663 A1 | 3/2019 | Yamazaki et al. | |
| 2019/0094876 A1 | 3/2019 | Moore et al. | |
| 2019/0108606 A1 | 4/2019 | Komiyama | |
| 2019/0156273 A1* | 5/2019 | Fisher | G06Q 10/087 |
| 2019/0156275 A1* | 5/2019 | Fisher | G06N 3/04 |
| 2019/0178436 A1 | 6/2019 | Mao et al. | |
| 2019/0180150 A1* | 6/2019 | Taylor | G06T 3/0062 |
| 2019/0197439 A1 | 6/2019 | Wang | |
| 2019/0197728 A1 | 6/2019 | Yamao | |
| 2019/0236530 A1 | 8/2019 | Cantrell et al. | |
| 2019/0304132 A1 | 10/2019 | Yoda et al. | |
| 2019/0392212 A1 | 12/2019 | Sawhney et al. | |
| 2020/0058129 A1* | 2/2020 | Guo | G06T 7/246 |
| 2020/0314333 A1 | 10/2020 | Liang et al. | |
| 2020/0379111 A1* | 12/2020 | Kimura | G01S 17/894 |
| 2020/0385012 A1* | 12/2020 | Maruyama | G06K 9/00791 |

FOREIGN PATENT DOCUMENTS

| | | |
|---|---|---|
| CN | 104200086 | 12/2014 |
| CN | 107067382 | 8/2017 |
| EP | 766098 | 4/1997 |
| EP | 1311993 | 5/2007 |
| EP | 2309378 | 4/2011 |
| EP | 2439487 | 4/2012 |
| EP | 2472475 | 7/2012 |
| EP | 2562688 | 2/2013 |
| EP | 2662831 | 11/2013 |
| EP | 2693362 | 2/2014 |
| GB | 2323238 | 9/1998 |
| GB | 2330265 | 4/1999 |
| JP | 2014170431 | 9/2014 |
| KR | 101234798 | 1/2009 |
| KR | 1020190031431 | 3/2019 |
| WO | WO 99/23600 | 5/1999 |
| WO | WO 2003002935 | 1/2003 |
| WO | WO 2003025805 | 3/2003 |
| WO | WO 2006136958 | 12/2006 |
| WO | WO 2007042251 | 4/2007 |
| WO | WO 2008057504 | 5/2008 |
| WO | WO 2008154611 | 12/2008 |
| WO | WO 2012103199 | 8/2012 |
| WO | WO 2012103202 | 8/2012 |
| WO | WO 2012154801 | 11/2012 |
| WO | WO 2013165674 | 11/2013 |
| WO | WO 2014066422 | 5/2014 |
| WO | WO 2014092552 | 6/2014 |
| WO | WO 2014181323 | 11/2014 |
| WO | WO 2015127503 | 9/2015 |
| WO | WO 2016020038 | 2/2016 |
| WO | WO 2018018007 | 1/2018 |
| WO | WO 2018204308 | 11/2018 |
| WO | WO 2018204342 | 11/2018 |
| WO | WO 2019023249 | 1/2019 |

OTHER PUBLICATIONS

"Improved library shelf reading using color feature matching of book-spine images"; Fowers, S.G., 2010 11th International Conference on Control Automation Robotics & Vision (pp. 2160-2165) (Year: 2010).*
"Supervised learning for Out-of-Stock detection in panoramas of retail shelves"; Luis Rosado, 2016 IEEE International Conference on Imaging Systems and Techniques (IST) (pp. 406-411) (Year: 2016).*
"Toward real-time grocery detection for the visually impaired"; Winlock, T., 2010 IEEE Computer Society Conference on Computer Vision and Pattern Recognition—Workshops (pp. 49-56) (Year: 2010).*
F.C.A. Groen et al., "The smallest box around a package," Pattern Recognition, vol. 14, No. 1-6, Jan. 1, 1981, pp. 173-176, XP055237156, GB, Issn: 0031-3203, DOI: 10.1016/0031-3203(81(90059-5 p. 176-p. 178.
Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference On, IEE, Piscataway, NJ, pp. 53-58 (Jun. 13, 2010).
Glassner, "Space Subdivision for Fast Ray Tracing." IEEE Computer Graphics and Applications, 4.10, pp. 15-24,1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds,"IEEE, 2016 Conference on Computer vision and Pattern recognition (CVPR), Jun. 27-30, 2016, pp. 1-9.
Hao et al., "Structure-based object detection from scene point clouds," Science Direct, V191, pp. 148-160 (2016).
Hu et al., "An improved method of discrete point cloud filtering based on complex environment," International Journal of Applied Mathematics and Statistics, v48, i18 (2013).
International Search Report and Written Opinion for International Patent Application No. PCT/US2013/070996 dated Apr. 2, 2014.
International Search Report and Written Opinion for International Patent Application No. PCT/US2013/053212 dated Dec. 1, 2014.
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/US2018/030419 dated Aug. 31, 2018.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion for International Application No. PCT/US2019/025859 dated Jul. 3, 2019.
International Search Report and Written Opinion from International Patent Application No. PCT/US2019/025849 dated Jul. 9, 2019.
International Search Report and Written Opinion from International Patent Application No. PCT/US2019/051312 dated Nov. 15, 2019.
International Search Report and Written Opinion from International Patent Application No. PCT/US2019/064020 dated Feb. 19, 2020.
International Search Report and Written Opinion for International Patent Application No. PCT/US2020/028133 dated Jul. 24, 2020.
International Search Report and Written Opinion from International Patent Application No. PCT/US2020/029134 dated Jul. 27, 2020.
International Search Report and Written Opinion from International Patent Application No. PCT/US2020/028183 dated Jul. 24, 2020.

(56) References Cited

OTHER PUBLICATIONS

International Search Report and Written Opinion from International Patent Application No. PCT/US2020/035285 dated Aug. 27, 2020.
Jadhav et al. "Survey on Spatial Domain dynamic template matching technique for scanning linear barcode," International Journal of science and research v 5 n 3, Mar. 2016)(Year: 2016).
Jian Fan et al: "Shelf detection via vanishing point and radial projection", 2014 IEEE International Conference on image processing (Icip), IEEE, (2014-10-27), pp. 1575-1578.
Kang et al., "Kinematic Path-Tracking of Mobile Robot Using Iterative learning Control", Journal of Robotic Systems, 2005, pp. 111-121.
Kay et al. "Ray Tracing Complex Scenes." Acm Siggraph Computer Graphics, vol. 20, No. 4, ACM, pp. 269-278, 1986.
Kelly et al., "Reactive Nonholonomic Trajectory Generation via Parametric Optimal Control", International Journal of Robotics Research, vol. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al.: "Localization in a wide range of industrial environments using relative 3D ceiling features", IEEE, pp. 333-337 (Sep. 15, 2008).
Lee et al. "Statistically Optimized Sampling for Distributed Ray Tracing." Acm Siggraph Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
Mcnaughton, Matthew, et al. "Motion planning for autonomous driving with a conformal spatiotemporal lattice." Robotics and Automation (ICRA), 2011 IEEE International Conference on. IEEE, 2011. (Year: 2011).
Meyersohn, "Walmart turns to robots and apps in stores", https://www.cnn.com/2018/12/07/business/walmart-robot-janitors-dotcom-store/index.html, Oct. 29, 2019.
Mitra et al., "Estimating surface normals in noisy point cloud data." International Journal of Computational geometry & applications, Jun. 8-10, 2003, pp. 322-328.
N.D.F. Campbell et al. "Automoatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, v8 I9, pp. 1-20 (2016).
Norriof et al., "Experimental comparison of some classical iterative learning control algorithms", IEEE Transactions on Robotics and Automation, Jun. 2002, pp. 636-641.
Notice of allowance for U.S. Appl. No. 16/561,175 dated Sep. 23, 2014.
Notice of allowance for U.S. Appl. No. 13/695.503 dated Mar. 11, 2016.
Notice of allowance for U.S. Appl. No. 14/068,495 dated Apr. 25, 2016.
Notice of allowance for U.S. Appl. No. 14/518,091 dated Apr. 12, 2017.
Notice of allowance for U.S. Appl. No. 15/211,103 dated Apr. 5, 2017.
Olson, Clark F., et al. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", 1EEE/RSJ International Conference on Intelligent robots and Systems, Nov. 2013, p. 176-181.
Park et al., "Autonomous mobile robot navigation using passive rfid in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Technology, v2n10, Oct. 2013) (Year: 2013).
Pivtoraiko et al., "Differentially constrained mobile robots motion planning in state lattices", journal of field robotics, vol. 26, No. 3, 2009, pp. 308-333.
Pratt W K Ed: "Digital image processing, 10-image enhancement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks,"in IEEE Workshop on Applications of computer vision (WACV), Jan. 2011.
Rusu, et al. "How to incrementally register pairs of clouds," PCL Library, retrieved from internet on Aug. 22, 2016 [http://pointclouds.org/documentation/tutorials/pairwise_incremental_registration.php.
Rusu, et al. "Spatial Change detection on unorganized point cloud data," PCL Library retrieved from internet on Aug. 19, 2016 [http://pointclouds.org/documentation/tutorials/octree_change.php].
Schnabel et al. "Efficient RANSAC for Point-Cloud Shape Detection", vol. 0, No. 0, pp. 1-12 (1081).
Senthilkumaran, et al., "Edge Detection Techniques for Image Segmentation-A Survery of Soft Computing Approaches", International Journal of Recent Trends in Engineering, vol. 1, No. 2 (May 2009).
Szeliski, "Modified Hough Transform", Computer Vision. Copyright 2011, pp. 251-254. Retrieved on Aug. 17, 2017 [http://szeliski.org/book/drafts/SzeliskiBook_20100903_draft.pdf].
Tahir, Rabbani, et al., "Segmentation of point clouds using smoothness constraint,"International Arches of Photogrammetry, Remote Sensing and Spatial Information Sciences 36.5 (Sep. 2006): 248-253.
Trevor et al., "Tables, Counter, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=p.
Tseng, et al., "A Cloud Removal Approach for Aerial Image Visulation", International Journal of Innovative Computing, Information & Control, vol. 9, No. 6, pp. 2421-2440 (Jun. 2013).
Uchiyama, et al., "Removal of Moving Objects from a Street-View Image by Fusing Multiple Image Sequences", Pattern Recognition, 2010, 20th International Conference on, IEEE, Piscataway, NJ pp. 3456-3459 (Aug. 23, 2010).
United Kingdom Intellectual Property Office, "Combined Search and Examination Report" for GB Patent Application No. 1813580.6 dated Feb. 21, 2019.
United Kingdom Intellectual Property Office, Combined Search and Examination Report dated Jan. 22, 2016 for GB Patent Application No. 1417218.3.
United Kingdom Intellectual Property Office, Combined Search and Examination Report dated Jan. 22, 2016 for GB Patent Application No. 1521272.3.
United Kingdom Intellectual Property Office, Combined Search and Examination Report dated Mar. 11, 2015 for GB Patent Application No. 1417218.3.
United Kingdom Intellectual Property Office, Combined Search and Examination Report dated May 13, 2020 for GB Patent Application No. 1917864.9.
Varol Gul et al: "Product placement detection based on image processing", 2014 22nd Signal Processing and Communication Applications Conference (SIU), IEEE, Apr. 23, 2014.

(56) References Cited

OTHER PUBLICATIONS

Varol Gul et al: "Toward Retail product recognition on Grocery shelves", Visual Communications and image processing; Jan. 20, 2004; San Jose, (Mar. 4, 2015).

Weber et al., "Methods for Feature Detection in Point clouds," visualization of large and unstructured data sets—IRTG Workshop, pp. 90-99 (2010).

Zhao Zhou et al.: "An Image contrast Enhancement Algorithm Using PLIP-based histrogram Modification", 2017 3rd IEEE International Conference on Cybernetics (CYBCON), IEEE, (Jun. 21, 2017).

Ziang Xie et al., "Multimodal Blending for High-Accuracy Instance Recognition", 2013 IEEE RSJ International Conference on Intelligent Robots and Systems, p. 2214-2221.

Fan Zhang et al., "Parallax-tolerant Image Stitching", 2014 Computer Vision Foundation, pp. 4321-4328.

Kaimo Lin et al., "SEAGULL: Seam-guided Local Alignment for Parallax-tolerant Image Stitching", Retrieved on Nov. 16, 2020 [http://publish.illinois.edu/visual-modeling-and-analytics/files/2016/08/Seagull.pdf].

Julio Zaragoza et al., "As-Projective-As-Possible Image Stitching with Moving DLT", 2013 Computer Vision Foundation, pp. 2339-2346.

"Plane Detection in Point Cloud Data" dated 2010-01-25 by Michael Ying Yang and Wolfgang Forstner, Technical Report 1, 2010, University of Bonn.

"Swift Dimension" Trademark Omniplanar, Copyright 2014.

Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.

Batalin et al., "Mobile robot navigation using a sensor network," IEEE, International Conference on robotics and automation, Apr. 26, May 1, 2004, pp. 636-641.

Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.

Biswas et al. "Depth Camera Based Indoor Mobile Robot Localization and Navigation" Robotics and Automation (ICRA), 2012 IEEE International Conference on IEEE, 2012.

Bohm, Multi-Image Fusion for Occlusion-Free Facade Texturing, International Archives of the Photogrammetry, Remote Sensing and Spatial Information Sciences, pp. 867-872 (Jan. 2004).

Bristow et al., "A Survey of Iterative Learning Control", IEEE Control Systems, Jun. 2006, pp. 96-114.

Buenaposada et al. "Realtime tracking and estimation of plane pose" Proceedings of the ICPR (Aug. 2002) vol. II, IEEE pp. 697-700.

Carreira et al., "Enhanced PCA-based localization using depth maps with missing data," IEEE, pp. 1-8, Apr. 24, 2013.

Chen et al. "Improving Octree-Based Occupancy Maps Using Environment Sparsity with Application to Aerial Robot Navigation" Robotics and Automation (ICRA), 2017 IEEE.

Cleveland Jones et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).

Cook et al., "Distributed Ray Tracing ACM SIGGRAPH Computer Graphics", vol. 18, No. 3, ACM pp. 137-145, 1984.

Datta, A., et al. "Accurate camera calibration using iterative refinement of control points," in Computer Vision Workshops (ICCV Workshops), 2009.

Deschaud, et al., "A Fast and Accurate Place Detection algoritm for large noisy point clouds using filtered normals and voxel growing," 3DPVT, May 2010, Paris, France.

Douillard, Bertrand, et al. "On the segmentation of 3D LIDAR point clouds." Robotic and Automation (ICRA), 2011 IEEE International Conference on IEEE, 2011.

Dubois, M., et al., 'A comparison of geometric and energy-based point cloud semantic segmentation methods, European Conference on Mobile Robots (ECMR), p. 88-93, Sep. 25-27, 2013.

Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).

\* cited by examiner

METHOD, SYSTEM AND APPARATUS FOR DETECTING ITEM FACINGS

BACKGROUND

Environments in which objects are managed, such as retail facilities, warehousing and distribution facilities, and the like, may store such objects in regions such as aisles of shelf modules or the like. For example, a retail facility may include objects such as products for purchase, and a distribution facility may include objects such as parcels or pallets. A mobile automation apparatus may be deployed within such facilities to perform tasks at various locations. For example, a mobile automation apparatus may be deployed to capture data representing an aisle and corresponding products in a retail facility. However, the variability of the products in the facility, as well as variations in data capture conditions (e.g. lighting and the like) can prevent the accurate detection of individual products and their status from such data.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
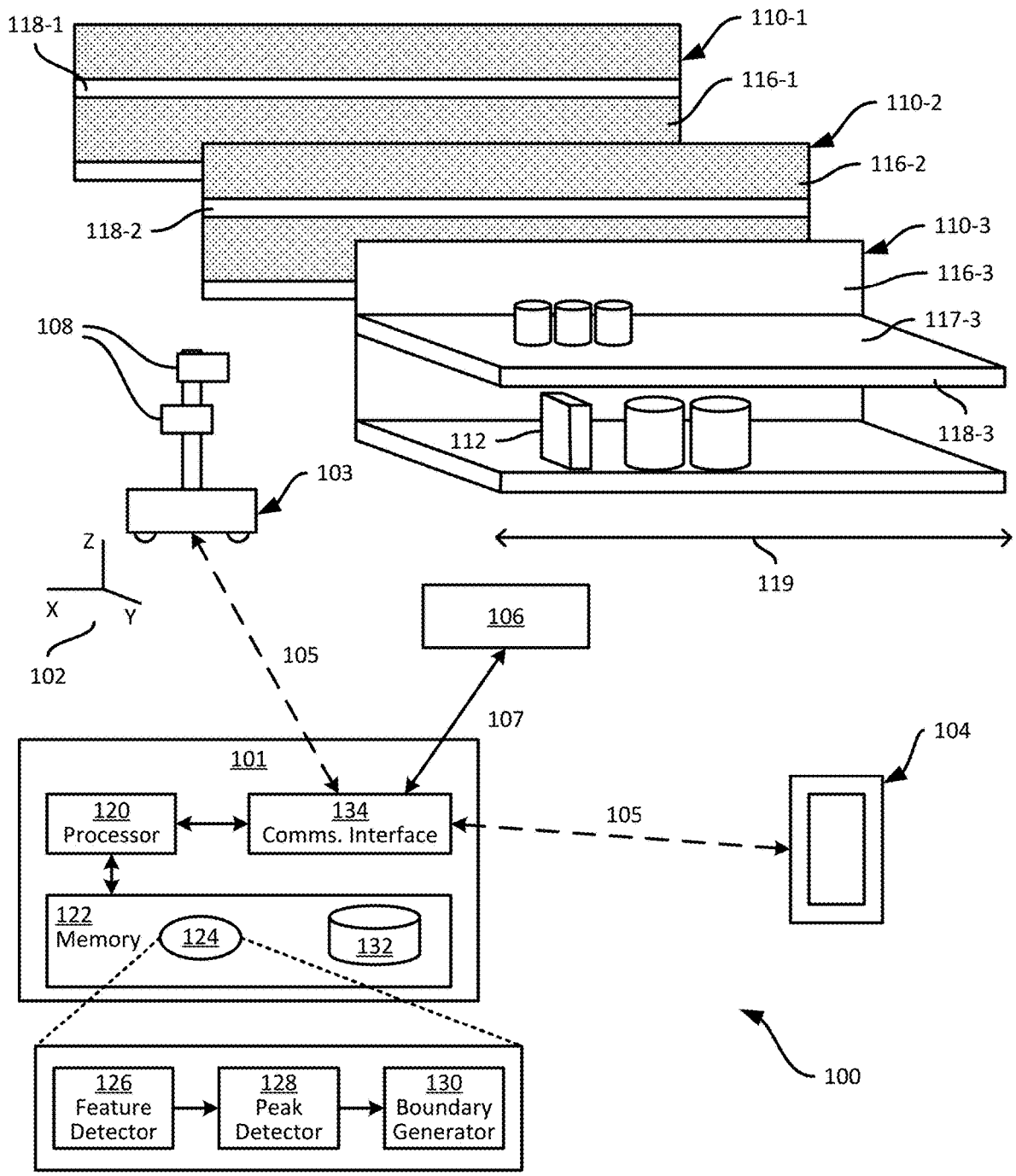
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method by an imaging controller of detecting item facings from image sensor data includes: obtaining, at the imaging controller, the image sensor data corresponding to a support structure containing at least one item; identifying, by a feature detector of the imaging controller, a set of matched keypoint pairs from keypoints of the image sensor data; determining, by a peak detector of the imaging controller, a separation distance between the keypoints of each matched keypoint pair; detecting, by the peak detector, a count of item instances represented in the image sensor data based on the separation distances; and presenting item facing detection output including the count of item instances.

Additional examples disclosed herein are directed to a computing device, comprising: a feature detector configured to: obtain image sensor data corresponding to a support structure containing at least one item; and identify a set of matched keypoint pairs from keypoints of the image sensor data; a peak detector configured to: determine a separation distance between the keypoints of each matched keypoint pair; detect a count of item instances represented in the image sensor data based on the separation distances; and a boundary generator configured to present item facing detection output including the count of item instances.

Further examples disclosed herein are directed to a non-transitory computer-readable medium storing instructions executable by an imaging controller to configure the imaging controller to: obtain image sensor data corresponding to a support structure containing at least one item; identify a set of matched keypoint pairs from keypoints of the image sensor data; determine a separation distance between the keypoints of each matched keypoint pair; detect a count of item instances represented in the image sensor data based on the separation distances; and present item facing detection output including the count of item instances.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 104 via communication links 105, illustrated in the present example as including wireless links. In the present example, the links 105 are provided by a wireless local area network (WLAN) deployed via one or more access points (not shown). In other examples, the server 101, the client device 104, or both, are located remotely (i.e. outside the environment in which the apparatus 103 is deployed), and the links 105 therefore include wide-area networks such as the Internet, mobile networks, and the like. The system 100 also includes a dock 106 for the apparatus 103 in the present example. The dock 106 is in communication with the server 101 via a link 107 that in the present example is a wired link. In other examples, however, the link 107 is a wireless link.

The client computing device 104 is illustrated in FIG. 1 as a mobile computing device, such as a tablet, smart phone or the like. In other examples, the client device 104 is implemented as another type of computing device, such as a desktop computer, a laptop computer, another server, a kiosk, a monitor, and the like. The system 100 can include a plurality of client devices 104 in communication with the server 101 via respective links 105.

The system 100 is deployed, in the illustrated example, in a retail facility including a plurality of support structures such as shelf modules 110-1, 110-2, 110-3 and so on (collectively referred to as shelf modules 110 or shelves 110, and generically referred to as a shelf module 110 or shelf 110—this nomenclature is also employed for other elements discussed herein). The support structures can have various other forms in some examples, including tables, peg boards and the like. Each shelf module 110 supports a plurality of items such as products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 (also referred to as sub-regions of the facility) are typically arranged in a plurality of aisles (also referred to as regions of the facility), each of which includes a plurality of modules 110 aligned end-to-end. In such arrangements, the shelf edges 118 face into the aisles, through which customers in the retail facility, as well as the apparatus 103, may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to the support surface 117-3 and to the underside (not shown) of the support surface 117-3. In other examples, the angles between the shelf edge 118-3 and the adjacent surfaces, such as the support surface 117-3, is more or less than ninety degrees.

The apparatus 103 is equipped with a plurality of navigation and data capture sensors 108, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 is deployed within the retail facility and, via communication with the server 101 and use of the sensors 108, navigates autonomously or partially autonomously along a length 119 of at least a portion of the shelves 110.

While navigating among the shelves 110, the apparatus 103 can capture images (also referred to as image sensor data), depth measurements and the like, representing the shelves 110 (generally referred to as shelf data or captured data). Navigation may be performed according to a frame of reference 102 established within the retail facility. The apparatus 103 therefore tracks its pose (i.e. location and orientation) in the frame of reference 102.

The server 101 includes a special purpose controller, such as a processor 120, specifically designed to control and/or assist the mobile automation apparatus 103 to navigate the environment and to capture data. The processor 120 is also specifically designed, as will be discussed in detail herein, to process image data and/or depth measurements captured by the apparatus 103 representing the shelf modules 110, in order to detect product facings on the shelf modules 110. As will be apparent to those skilled in the art, a product facing is a single instance of a product facing into the aisle. Thus, if a support surface 117 carries three identical products adjacent to one another, the products represent three distinct facings. The resulting detected product facings can be provided to product status detection mechanisms (which may also be implemented by the processor 120 itself).

The processor 120 is interconnected with a non-transitory computer readable storage medium, such as a memory 122. The memory 122 includes a combination of volatile memory (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The memory 122 stores computer readable instructions for performing various actions, including control of the apparatus 103 to navigate the shelf modules 110 and capture shelf data, as well as post-processing of the shelf data. The execution of the above-mentioned instructions by the processor 120 configures the server 101 to perform various actions discussed herein. The applications stored in the memory 122 include an item facing detection application 124 (also simply referred to as the application 124). In general, via execution of the application 124 or subcomponents thereof and in conjunction with other components of the server 101, the processor 120 performs various actions to detect, in image data and depth measurements representing the shelves 110 (e.g. data captured by the apparatus 103), individual product facings, for use in downstream processing to detect product status information (e.g. whether products are out of stock, misplaced or the like).

Certain example components of the application 124 are shown in FIG. 1, including a feature detector 126, a peak detector 128, and a boundary generator 130. The feature detector 126 selects keypoints from image data depicting the products (e.g. distinct, repeatably identifiable regions in the image) and identifies pairs of such keypoints with matching properties. That is, the feature detector 126 detects portions of the image that appear to depict similar features of distinct instances of a given product 112. The peak detector 128 detects a count of the instances of the above-mentioned product 112 appearing in the image data, based on the output of the feature detector 126. The boundary generator 130, in turn, employs the output of either or both of the feature detector 126 and the peak detector 128 to generate boundaries for each instance of the product 112 in the image data.

In other embodiments, the application 124 may be implemented as a suite of logically distinct application, each implementing a suitable portion of the functionality discussed below. For example, the detectors 126 and 128, as well as the boundary generator 130, may be implemented as separate applications.

The memory 122 can also store data for use in the above-mentioned control of the apparatus 103, such as a repository 132 containing a map of the retail environment and any other suitable data (e.g. operational constraints for use in controlling the apparatus 103, data captured by the apparatus 103, and the like).

The processor 120, as configured via the execution of the application 124, is also referred to herein as an imaging controller 120, or simply as a controller 120. As will now be apparent, some or all of the functionality implemented by the imaging controller 120 described below may also be performed by preconfigured special purpose hardware controllers (e.g. one or more logic circuit arrangements specifically configured to optimize the speed of image processing, for example via FPGAs and/or Application-Specific Integrated Circuits (ASICs) configured for this purpose) rather than by execution of the application 124 by the processor 120.

The server 101 also includes a communications interface 134 interconnected with the processor 120. The communications interface 134 includes suitable hardware (e.g. transmitters, receivers, network interface controllers and the like) allowing the server 101 to communicate with other computing devices—particularly the apparatus 103, the client device 104 and the dock 106—via the links 105 and 107. The links 105 and 107 may be direct links, or links that traverse one or more networks, including both local and wide-area networks. The specific components of the communications interface 134 are selected based on the type of network or other links that the server 101 is required to communicate over. In the present example, as noted earlier, a wireless local-area network is implemented within the retail facility via the deployment of one or more wireless access points. The links 105 therefore include either or both wireless links between the apparatus 103 and the mobile device 104 and the above-mentioned access points, and a wired link (e.g. an Ethernet-based link) between the server 101 and the access point.

The processor 120 can therefore obtain data captured by the apparatus 103 via the communications interface 134 for storage (e.g. in the repository 132) and subsequent processing, e.g. via execution of the application 124 to detect product facings, as noted above). The server 101 may also transmit status notifications (e.g. notifications indicating that products are out-of-stock, in low stock or misplaced) to the client device 104 responsive to the determination of product status data. The client device 104 includes one or more controllers (e.g. central processing units (CPUs) and/or field-programmable gate arrays (FPGAs) and the like) configured to process (e.g. to display) notifications received from the server 101.

Figure 2:
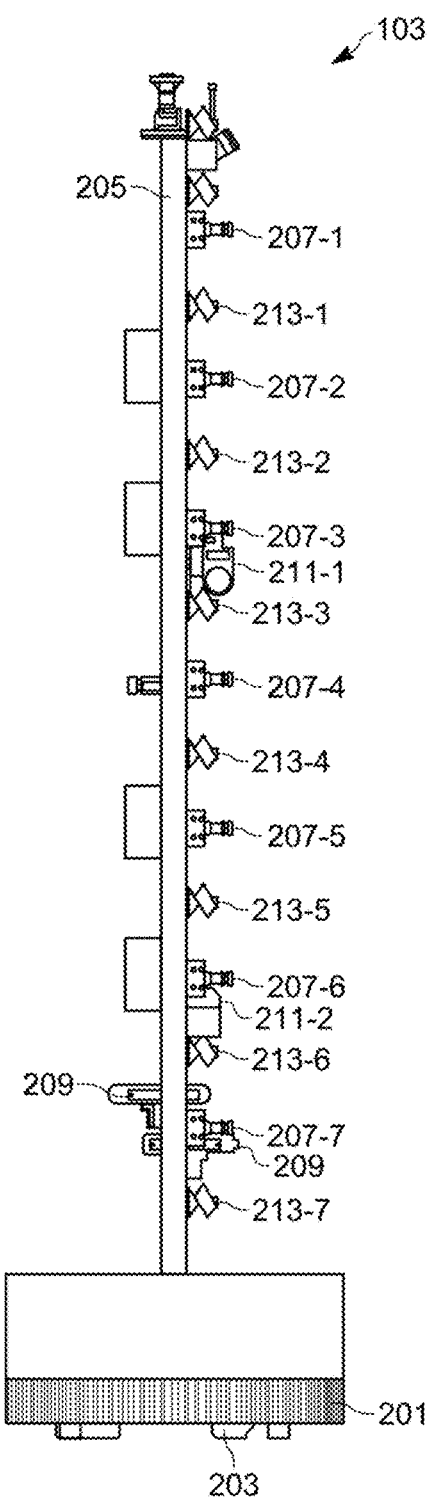
FIG. 2 depicts a mobile automation apparatus in the system of FIG. 1.

Turning now to FIG. 2, the mobile automation apparatus 103 is shown in greater detail. The apparatus 103 includes a chassis 201 containing a locomotive assembly 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 108 mentioned earlier. In particular, the sensors 108 include at least one imaging sensor 207, such as a digital camera. In the present example, the mast 205 supports seven digital cameras 207-1 through 207-7 oriented to face the shelves 110.

The mast 205 also supports at least one depth sensor 209, such as a 3D digital camera capable of capturing both depth data and image data. The apparatus 103 also includes additional depth sensors, such as LIDAR sensors 211. In the present example, the mast 205 supports two LIDAR sensors 211-1 and 211-2. In other examples, the mast 205 can support additional LIDAR sensors 211 (e.g. four LIDARs 211). As shown in FIG. 2, the cameras 207 and the LIDAR sensors 211 are arranged on one side of the mast 205, while the depth sensor 209 is arranged on a front of the mast 205. That is, the depth sensor 209 is forward-facing (i.e. captures data in the direction of travel of the apparatus 103), while the cameras 207 and LIDAR sensors 211 are side-facing (i.e. capture data alongside the apparatus 103, in a direction perpendicular to the direction of travel). In other examples, the apparatus 103 includes additional sensors, such as one or more RFID readers, temperature sensors, and the like.

The mast 205 also supports a plurality of illumination assemblies 213, configured to illuminate the fields of view of the respective cameras 207. That is, the illumination assembly 213-1 illuminates the field of view of the camera 207-1, and so on. The cameras 207 and LIDARs 211 are oriented on the mast 205 such that the fields of view of the sensors each face a shelf 110 along the length 119 of which the apparatus 103 is traveling. As noted earlier, the apparatus 103 is configured to track a pose of the apparatus 103 (e.g. a location and orientation of the center of the chassis 201) in the frame of reference 102, permitting data captured by the apparatus 103 to be registered to the frame of reference 102 for subsequent processing.

Figure 3:
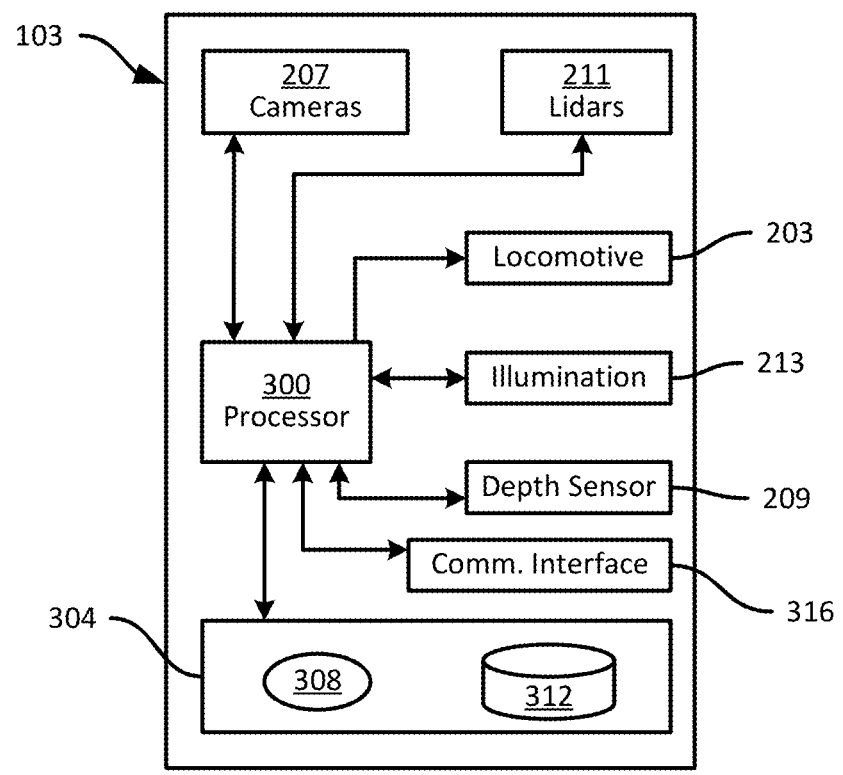
FIG. 3 is a block diagram of certain internal components of the mobile automation apparatus in the system of FIG. 1.

Referring to FIG. 3, certain components of the mobile automation apparatus 103 are shown, in addition to the cameras 207, depth sensor 209, LIDARs 211, and illumination assemblies 213 mentioned above. The apparatus 103 includes a special-purpose controller, such as a processor 300, interconnected with a non-transitory computer readable storage medium, such as a memory 304. The memory 304 includes a suitable combination of volatile memory (e.g. Random Access Memory or RAM) and non-volatile memory (e.g. read only memory or ROM, Electrically Erasable Programmable Read Only Memory or EEPROM, flash memory). The processor 300 and the memory 304 each comprise one or more integrated circuits.

The memory 304 stores computer readable instructions for execution by the processor 300. In particular, the memory 304 stores an apparatus control application 308 which, when executed by the processor 300, configures the processor 300 to perform various functions related to navigating the facility and controlling the sensors 108 to capture data, e.g. responsive to instructions from the server 101. Those skilled in the art will appreciate that the functionality implemented by the processor 300 via the execution of the application 308 may also be implemented by one or more specially designed hardware and firmware components, such as FPGAs, ASICs and the like in other embodiments.

The memory 304 may also store a repository 312 containing, for example, a map of the environment in which the apparatus 103 operates, for use during the execution of the application 308. The apparatus 103 also includes a communications interface 316 enabling the apparatus 103 to communicate with the server 101 (e.g. via the link 105 or via the dock 106 and the link 107), for example to receive instructions to navigate to specified locations and initiate data capture operations.

The actions performed by the server 101, and specifically by the processor 120 as configured via execution of the application 124, to detect product facings from captured data representing the shelves 110 (e.g. images and depth measurements captured by the apparatus 103) will now be discussed in greater detail with reference to FIG. 4.

Figure 4:
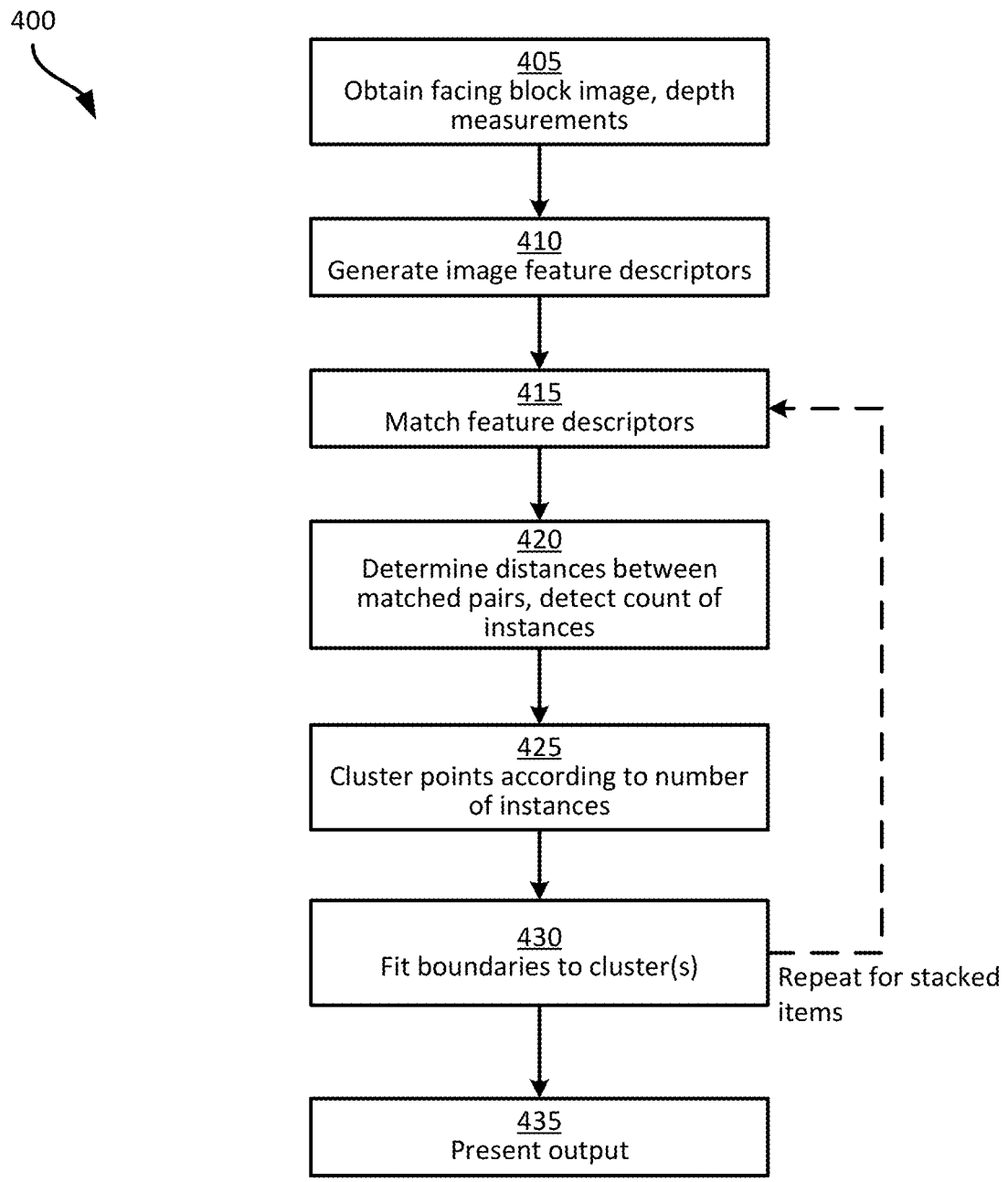
FIG. 4 is a flowchart of a method of detecting product facings in the system of FIG. 1.

FIG. 4 illustrates a method 400 of detecting product facings. The method 400 will be described in conjunction with its performance in the system 100, and in particular by the server 101, with reference to the components illustrated in FIG. 1. As will be apparent in the discussion below, in other examples, some or all of the processing described below as being performed by the server 101 may alternatively be performed by the apparatus 103.

At block 405, the server 101, and particularly the feature detector 126, obtains at least an image corresponding to an area of a shelf 110 that contains at least one product 112. In particular, the area in the examples discussed below can contain as few as one product 112 of a given type, or multiple contiguous products 112 of that type. As will be apparent to those skilled in the art, products 112 that are arranged contiguously (i.e. immediately adjacent to one another on the shelf module 110, including being in physical contact with one another) may be difficult to segment by processing image and/or depth data according to other techniques such as edge detection.

The area mentioned above may also be referred to as a facing block, in that the image represents a block of at least one instance of a product 112, up to an unknown number of instances of the product 112. The server 101 may also obtain, at block 405, a set of depth measurements corresponding to the facing block. The depth measurements can be, for example, a plurality of sets of coordinates in the frame of reference 102. The image and depth data noted above may have been previously acquired by the apparatus 103 and provided to the server 101 for further processing.

Figure 5:
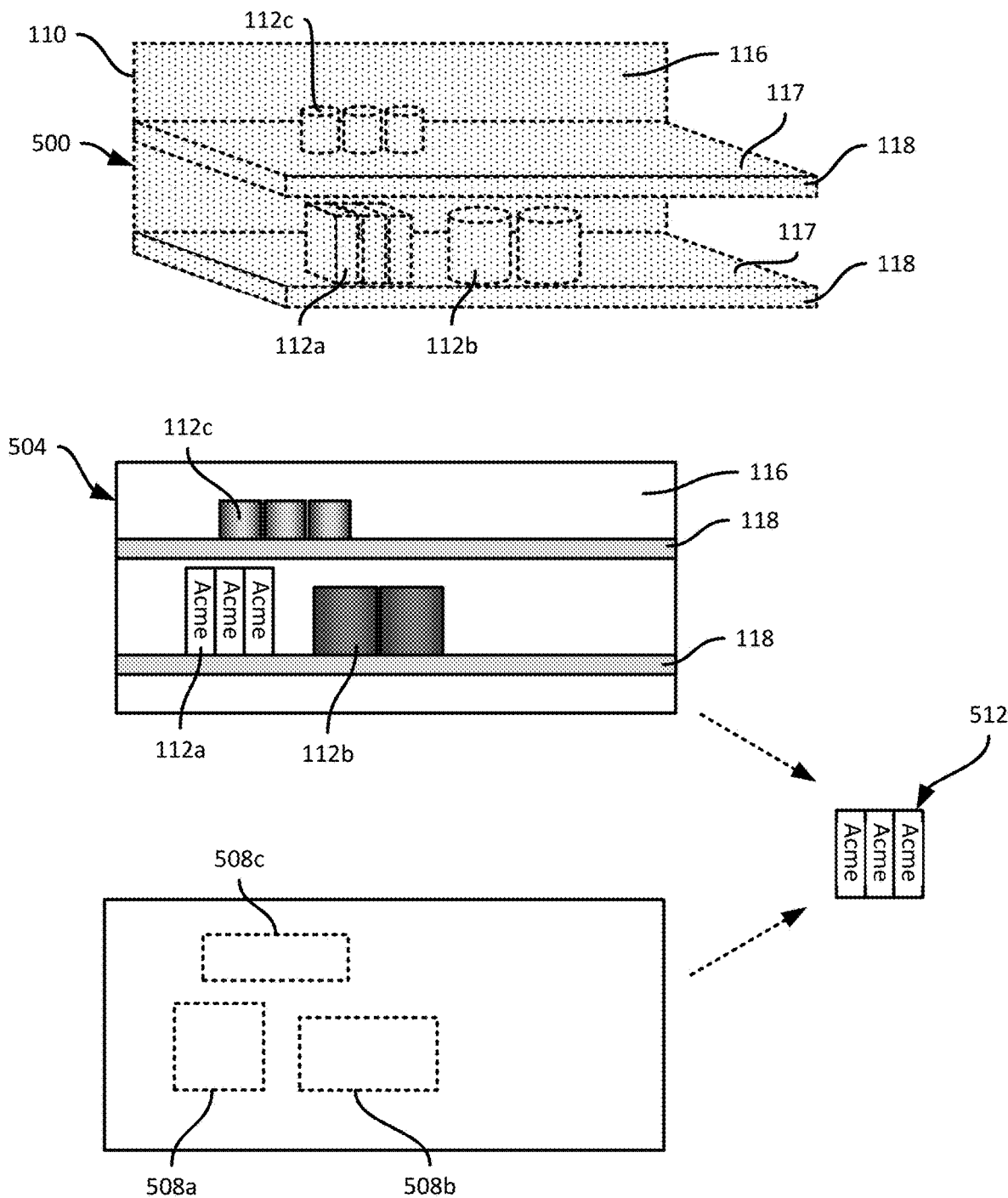
FIG. 5 is a diagram illustrating input data to the method of FIG. 4.

The image data and depth data obtained at block 405 can be obtained in various ways. For example, turning to FIG. 5, the server 101 can extract the image and depth data from a larger data set based on a region of interest indicator defining the facing block area. In particular, FIG. 5 illustrates a point cloud 500 containing a plurality of depth measurements representing a shelf module 110 supporting various products 112. In particular, the point cloud 500 depicts three facings of a first product 112a, two facings of a second product 112b, and three facings of a third product 112c.

FIG. 5 also illustrates an image 504 of the shelf module 110 depicted by the point cloud 500. The image may be, for example, an RGB image captured by the apparatus 103 substantially simultaneously with the capture of the point cloud 500. The image 504 also depicts (albeit in two dimensions, rather than three dimensions) the shelf edges 118, shelf back 116, and products 112a, 112b and 112c as the point cloud 500. Finally, FIG. 5 illustrates a set of ROI indicators, or facing block areas, 508a, 508b and 508c indicating positions of product blobs detected, e.g. by the server 101 or another computing device. Detection of the ROI indicators can be performed based on any suitable combination of depth measurements and images, including the point cloud 500 and the image 504. The ROI indicators are illustrated in two dimensions, but can also be defined in three dimensions, according to the frame of reference 102. As is evident from FIG. 5, the ROI indicators 508 correspond to the respective positions of the products 112a, 112b and 112c, but do not distinguish between the individual product facings shown in the point cloud 500 and the image 504. The spaces between products 112 on the shelves 110 may be small enough that detecting individual product facings, in the absence of the processing techniques described below, is inaccurate or overly computationally expensive.

From the input data set out above, at block 405 the server can extract an image of a particular facing block for further processing. For example, an image 512 corresponding to the facing block 508a (i.e. the ROI indicator 508a) is shown separately from the image 504. The process described below can later be repeated for the other facing block areas 508. In other examples, the above processing to extract the relevant image and depth data can be performed previously, or by another computing device, such that at block 405 the server 101 simply retrieves the image 512, e.g. from the repository 132.

Returning to FIG. 4, at block 410 the server 101, and in particular the feature detector 126, is configured to generate feature descriptors for a set of keypoints, or interest points, of the image 512. The server 101 can implement any of a wide variety of keypoint selection and feature descriptor generation mechanisms. Examples of such mechanisms include an Oriented FAST and Rotated BRIEF (ORB) feature generator, a Scale Invariant Feature Transform (SIFT) feature generator, and the like. In general, such mechanisms select certain points in the image 512 that have sufficiently distinctive surrounding regions (a surrounding region can be a patch of 10×10 pixels centered on the keypoint, for example; various other surrounding region shapes and sizes may also be employed) that the keypoint can be readily identified in another image or another portion of the same image. The nature of the feature descriptors generated at block 410 varies with the mechanism implemented by the server 101. For example, if the server 101 implements an ORB feature generator at block 410, the feature descriptors are, for each keypoint, a one-dimensional binary vector of configurable length (e.g. 128 bits).

Figure 6:
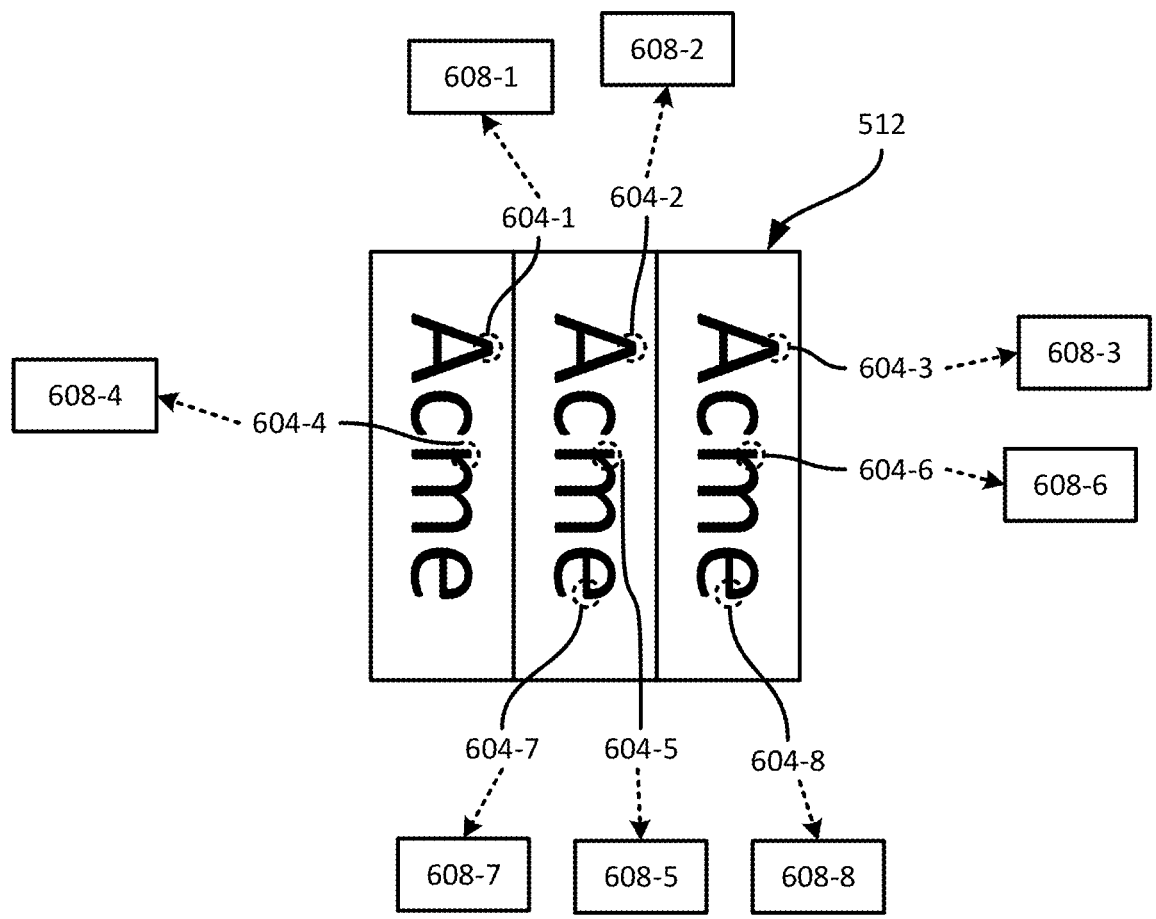
FIG. 6 is a diagram illustrating detection of image keypoints at block 410 of the method of FIG. 4.

Turning to FIG. 6, the image 512 is shown, with several example keypoints 604 (specifically, eight sample keypoints 604-1 through 604-8). For each keypoint 604, the server 101 generates a feature descriptor 608, such as the above-mentioned vector 608. Thus, eight feature descriptors 608-1 through 608-8 are shown in FIG. 6. As will be apparent to those skilled in the art, the process of identifying keypoints and generating feature descriptors may yield a greater number of keypoints and corresponding feature descriptors than the set of eight shown in FIG. 6.

Referring again to FIG. 4, having generated feature descriptors at block 410, at block 415 the server 101 identifies a set of matched keypoint pairs based on the feature descriptors. Returning to FIG. 6, it will be apparent that several of the keypoints 604 depict repeating image features. For example, the keypoints 604-1, 604-2 and 604-3 each correspond to the apex of the letter "A" on separate instances of a product 112a. Similarly, the keypoints 604-4, 604-5 and 604-6 correspond to distinct instances of the same image feature, as do the keypoints 604-7 and 604-8. The feature descriptors 608 of such keypoints are therefore expected to be similar (although not necessarily identical).

At block 415, the feature detector 126 is configured to identify pairs of feature descriptors that are equal or sufficiently similar, and store (e.g. in the memory 122) the pairs for further processing. Various search mechanisms can be employed to identify matched pairs of keypoints 604. For example, the feature detector 126 can select each feature descriptor 608 in turn and generate a difference metric between the selected feature descriptor 608 and every other feature descriptor 608. An example of a difference metric that may be employed with ORB feature descriptors is the Hamming distance.

In the example illustrated in FIG. 6, therefore, seven difference metrics can be computed for each feature descriptor 608. Matches can be selected for a given feature descriptor 608 by selecting the other feature descriptor 608 having the lowest difference metric. Because the method 400 seeks to identify multiple instances of a product 112, however, more than one pairing may exist for each feature descriptor 608. The server 101 can therefore select not only the single other feature descriptor 608 with the lowest difference metric, but a configurable number of other feature descriptors 608. For example, the server 101 can select, for each feature descriptor 608, the three closest feature descriptors 608 and therefore store three matched keypoint pairs.

Various optimizations can be applied to the performance of block 415. For example, rather than performing the above-mentioned brute force search, the server 101 may generate a k-d tree containing the feature descriptors 608 and perform searches for matching feature descriptors 608 using the k-d tree.

Figure 7:
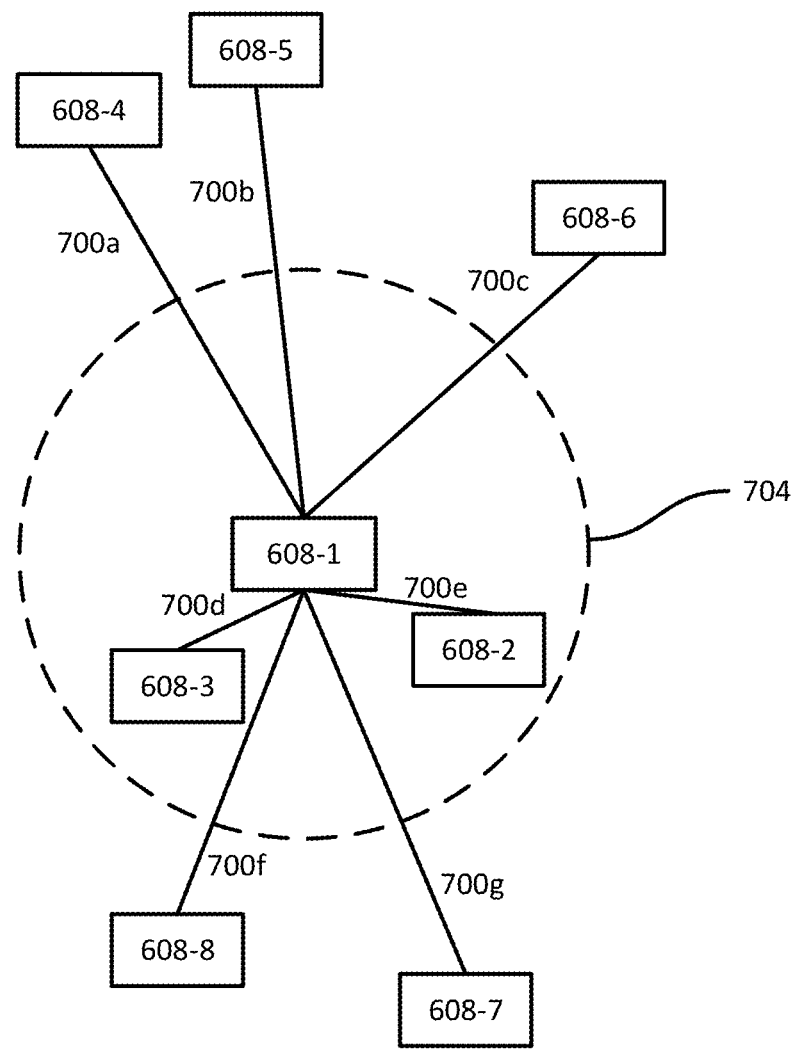
FIG. 7 is a diagram illustrating an example performance of block 415 of the method of FIG. 4.

In addition, referring to FIG. 7, the server 101 can apply a threshold to the difference metric. FIG. 7 provides a graphical representation of the identification of matching feature descriptors 608 for the feature descriptor 608-1. Each other feature descriptor 608 is shown along with a graphical representation of a difference metric 700 between that feature descriptor 608 and the feature descriptor 608-1. Longer representations of difference metrics 700 indicate that the relevant feature descriptors 608 are less similar.

FIG. 7 also illustrates a selection threshold 704, presented as a circular region centered on the feature descriptor 608-1. The server 101 can be configured to select, as matches for the feature descriptor 608-1, up to three (or any other preconfigured number, e.g. selected to meet or exceed the maximum potential number of product instances in the image 512) nearest neighbors, based on the difference metrics, with the condition that any selected matching feature descriptor 608 has a difference metric 700 below the threshold 704. Therefore, in the present example, the feature descriptors 608-3 and 608-2 are selected as matches to the feature descriptor 608-1. In other words, two matched keypoint pairs are produced from the selection shown in FIG. 7: the pair consisting of the feature descriptors 608-1 and 608-2, and the pair consisting of the feature descriptors 608-1 and 608-3. The above process can be repeated to identify matches for each other feature descriptor 608.

The performance of block 415, therefore, results in a number of matched keypoint pairs. In the example shown in FIG. 6, the matched keypoint pairs resulting from block 415 may include: [604-1, 604-2], [604-1, 604-3], [604-4, 604-5], [604-4, 604-6], [604-7, 604-8]. As will be seen from FIG. 6, a third instance of the image feature corresponding to the keypoints 604-7 and 604-8 was not selected at block 410. Lighting conditions, image capture artifacts, or the like, may result in certain instances of repeating image features not being detected.

At block 420, the server 101 is configured to determine distances between the matched keypoint pairs from block 415, and to detect a number of product instances in the image from block 405 based on those distances. The distances determined at block 420 can be physical distances, for example based on the depth measurements obtained at block 405. That is, the peak detector 128 of the server 101 can be configured to register (e.g. via back-projection) each of the keypoints 604 to the depth measurements in the point cloud 500, to determine a three-dimensional location of each keypoint 604 according to the frame of reference 604. In the present example, the distances determined at block 420 are horizontal distances (e.g. distances along the X axis of the frame of reference 102 as shown in FIG. 1), reflecting the expectation that repeating instances of products are arranged substantially horizontally along the shelf modules 110. That is, to the extent that a given pair of matched keypoints 604 are not at the same elevation (i.e. position on the Z axis of the frame of reference 102), differences in elevation may be ignored at block 420 in the present example. Depth-wise spacing (i.e. along the Y axis shown in FIG. 1) may also be ignored at block 420.

Figure 8:
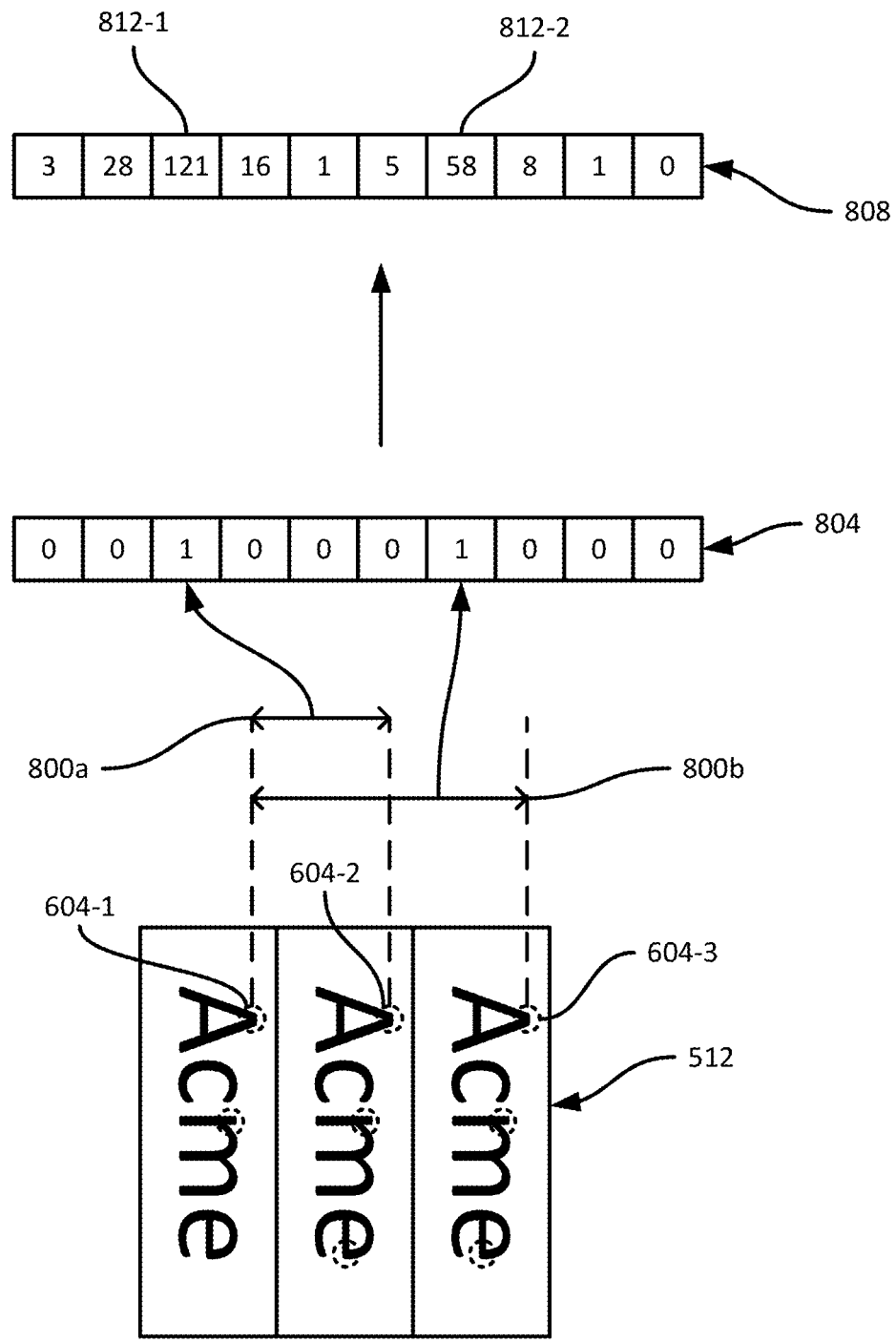
FIG. 8 is a diagram illustrating an example performance of block 420 of the method of FIG. 4.

Referring to FIG. 8, distances 800a and 800b are shown for the matched keypoint pairs [604-1, 604-2] and [604-1, 604-3]. To detect a number of product instances at block 420, the peak detector 128 can be configured to generate a histogram of distances. Specifically, the histogram can include a plurality of bins each corresponding to a selected range of distances. For example, the total width (in the X direction) of the area represented by the image 512 can be determined, and divided into a predefined number of bins. For each distance from the block 420, the corresponding bin is identified (i.e. the bin whose range encompasses the distance), and a score associated with that bin is incremented by one. For example, FIG. 8 illustrates an incomplete histogram 804 having ten bins corresponding to ten segments of the width of the image 512. The score associated with the third bin has been incremented by one for the distance 800a, and the score associated with the seventh bin has been incremented by one for the distance 800b.

The process shown in FIG. 8 for the distances 800a and 800b is repeated for each other matched keypoint pair identified at block 415. An example completed histogram 808 is also shown in FIG. 8, in which a greater number of keypoints than the sample set shown in FIGS. 6-8 have been matched and allocated to bins. To complete the performance of block 420, the peak detector 128 is configured to detect peaks in the histogram 808. Peak detection can be performed by implementing a suitable local maximum detection mechanism. Via such a local maximum detection mechanism, the peak detector 128 can detect peaks at the bins 812-1 and 812-2 in the illustrated example.

The number of product instances detected at block 420 is the number of peaks detected, increased by one. As will now be apparent, each peak indicates a recurring distance between matched keypoint pairs. That is, each peak indicates the presence of multiple matched keypoint pairs with similar spacing. For example, the matched keypoint pairs [604-1, 604-3] and [604-7, 604-8], as seen in FIG. 6, are separated by substantially the same horizontal distance. In other words, a peak in the histogram 808 indicates two distinct product instances. The total of two peaks in the histogram 808 indicates three distinct product instances.

The peak detector 128 can also apply a minimum threshold to peak detection, such that a local maximum is only identified as a peak if the score exceeds the threshold. In the event that the image data from block 405 depicts a single product instance, the feature detector 126 may detect few or no matched keypoint pairs, and the histogram generated at block 420 may therefore include scores that only represent a small proportion of the total number of identified keypoints. Under such conditions, local maxima in the histogram may still exist due to features matched within the same product instance, but such local maxima are likely to be smaller (i.e. have lower scores) than peaks resulting from repeated product instances. By applying a magnitude threshold to the peaks identified at block 420, the peak detector 128 may avoid detecting peaks that result from matches within a product instance rather than peaks that are indicative of distinct products instances.

Referring again to FIG. 4, at block 425 the boundary generator 130 of the server 101 is configured to allocate each keypoint 604 to one of a set of clusters equal in number to the count of product instances detected at block 420. The clusters may then, as will be discussed below, be employed to generate boundaries (e.g. bounding boxes in the frame of reference 102) for each product instance depicted in the image 512.

Allocation of keypoints 604 to clusters may be performed by the boundary generator 130 according to a suitable clustering mechanism, such as k-means clustering or the like. The count of product instances (three, in the present example performance of the method 400) detected at block 420 is provided to the clustering mechanism as an input. That is, the boundary generator 130 is configured to allocate the keypoints 604 to a specific number of clusters, given by the result of block 420.

In some examples, the allocation of keypoints 604 to clusters is based not only on the count of product instances detected at block 420, but also on the distances determined at block 420 and the results of block 415 (indicating which keypoints 604 are paired). In the present example, clustering of the keypoints 604 is performed at block 425 by implementing a spectral clustering algorithm, such as that described in Ng, A. Y. & Jordan, M. & Weiss, Y. (2001). On Spectral Clustering: Analysis and an Algorithm. *Proceedings Adv. Neural Inf. Process Syst.* 14. The spectral clustering mechanism accepts as inputs an expected number of clusters (i.e. the detected count of product instances from block 420), and an affinity matrix. The affinity matrix indicates a degree of similarity between each pair of keypoints 604 (not only the matched keypoint pairs mentioned above). That is, an affinity value may be assigned to each pair of keypoints, such as a value between zero and one.

In general, a pair of keypoints 604 with a greater affinity value (e.g. closer to one) are more likely to be placed in the same cluster, while a pair of keypoints with a smaller affinity value (e.g. closer to zero) are more likely to be placed in different clusters. When the boundary generator 130 implements spectral clustering at block 425, the affinity matrix can be initialized based on the results of blocks 415 and 420.

Figure 9:
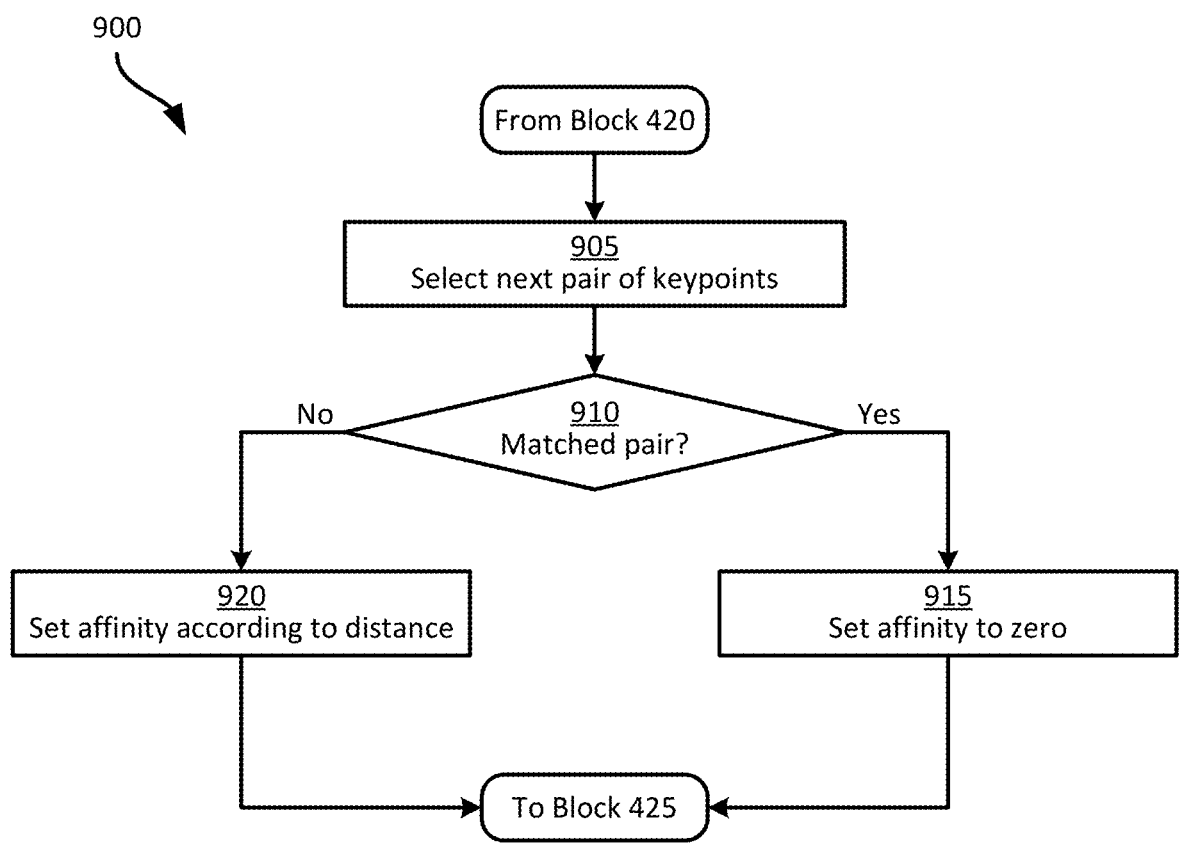
FIG. 9 is a flowchart of a method for allocating keypoints to clusters at block 425 of the method of FIG. 4.

In particular, referring to FIG. 9, a method 900 is illustrated of initializing affinity values for use in spectral clustering at block 425. At block 905, the boundary generator 130 selects a pair of keypoints 604. The performance of the method 900 is repeated for every pair of keypoints 604, and not only for the matched keypoint pairs discussed earlier.

At block 910, the server 101 determines whether the selected pair of keypoints 604 is a matched pair, according to the results of block 415. For example, the determination at block 910 is affirmative for the keypoints 604-1 and 604-3. The server 101 therefore proceeds to block 915, at which the affinity value corresponding to the selected pair is set to zero. In other words, if the selected pair of keypoints 604 is a matched pair, the matched pair is assumed to depict two instances of the same product feature. Therefore, each member of the matched pair is associated with a different product instance, and is to be placed in a different cluster. Setting the affinity measurement to zero increases the likelihood that the keypoints 604 will be assigned to distinct clusters.

When the determination at block 910 is negative, as in the example of the keypoints 604-2 and 604-7, the server 101 proceeds to block 920 rather than block 915. At block 920, an affinity value is set for the selected pair of keypoints 604 based on the distance separating the selected keypoints 604. Specifically, the affinity value set at block 920 is inversely proportional to the distance separating the selected pair of keypoints 604, reflecting an assumption that keypoints 604 that are more distant from one another are more likely to correspond to distinct product instances.

Figure 10:
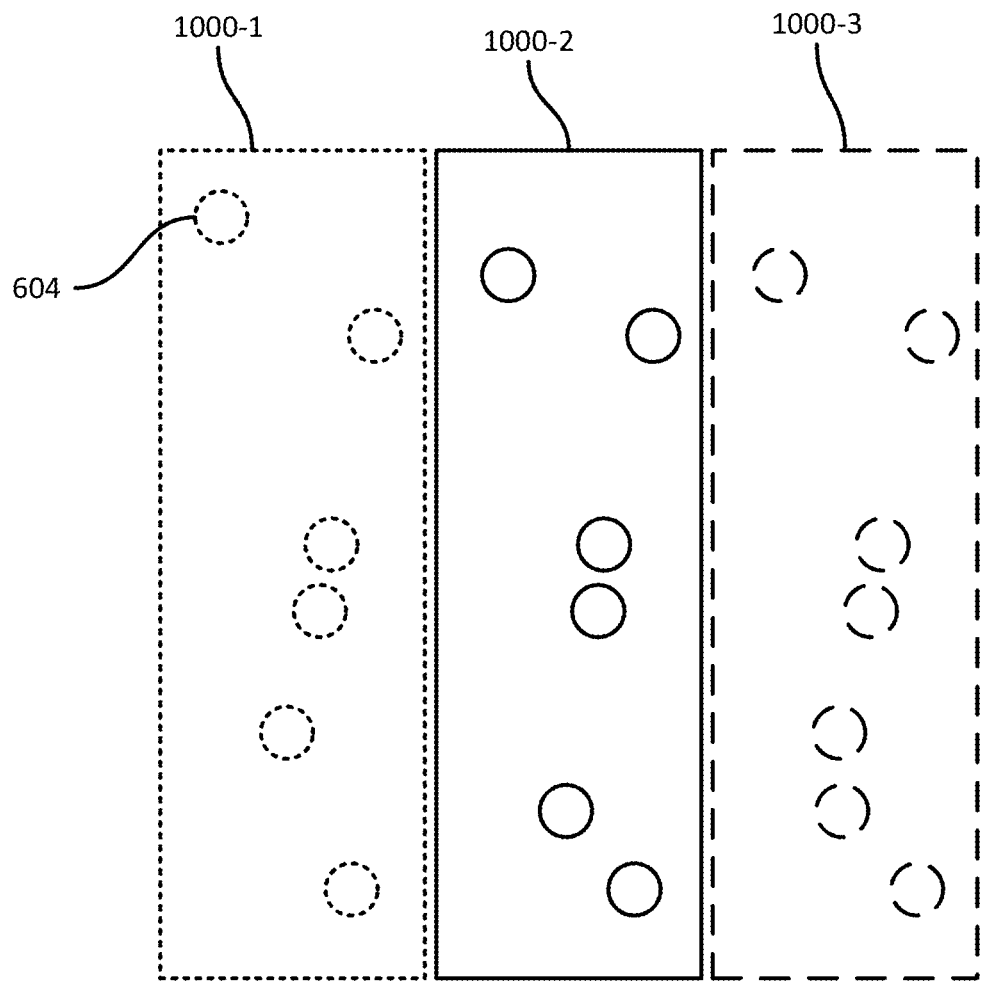
FIG. 10 is a diagram illustrating a performance of blocks 425 and 430 of the method of FIG. 4.

FIG. 10 illustrates an example set of keypoints 604 following a performance of block 425. In particular, the keypoints 604 shown in short dashed lines have been assigned to a first cluster, the keypoints 604 shown in solid lines have been assigned to a second cluster, and the keypoints 604 shown in long dashed lines have been assigned to a third cluster. The server 101 can store, in association with each keypoint 604, a cluster identifier indicating which cluster the keypoint 604 was allocated to.

At block 430, the server 101 can be configured to generate item boundaries corresponding to detected product instances, based on the results of block 430. In particular, the boundary generator 130 can be configured to fit a boundary (e.g. a rectangular boundary, although other shapes of boundary may also be generated in other examples. Various boundary fitting mechanisms (e.g. RANSAC-based fitting, Minimum Volume Bounding Box, or the like) can be implemented by the boundary generator 130 at block 430 to generate the boundaries, for example as three-dimensional bounding boxes defined according to the frame of reference 102.

Referring again to FIG. 10, three example boundaries 1000-1, 1000-2 and 1000-3 are shown as having been generated based on the keypoints 604 in each of the above-mentioned clusters. As will be apparent from FIG. 10, the boundaries 1000 indicate the presence, and the detected positions, of three distinct product instances, corresponding to the three products 112a shown in the image 512.

At block 435, the server 101 is configured to present item facing detection output, e.g. via a display connected to the server 101, and/or by transmitting output to the client device 104, and/or by providing the output to another component of the server 101 itself for further processing, or the like. The item facing detection output can include at least one of the count of item instances detected at block 420 and the boundaries generated at block 430. The item facing detection output can also be stored, e.g. in the memory 122.

Variations to the functionality described above are contemplated. For example, the server 101 can be configured to detect vertically stacked products 112 as well as horizontally arranged products 112 such as those shown in the image 512. In particular, as shown with a dashed line in FIG. 4 extending from block 430 to block 415, the performance of blocks 415-430 can be repeated for two physical dimensions associated with the support structures 110. More specifically, the server 101 can perform blocks 415-430 for a first physical dimension, such as the horizontal direction (e.g. the X axis of the frame of reference 102), and then repeat the performance of blocks 415-430 for a second physical dimension, such as the vertical direction (e.g. the Z axis of the frame of reference 102).

The performance of block 415 in such examples may be constrained to match keypoints separated by a minimum distance in the dimension currently being processed in the image sensor data. In addition, processing for the second physical dimension may include multiple performances of blocks 415-430, once for each cluster identified at block 430 for the first physical dimension. For example, a first performance of blocks 415-430 may segment the image sensor data into three horizontally-arranged clusters. Blocks 415-430 are then repeated three times, restricting each performance to the image sensor data within a respective horizontal cluster. In other examples, the above-mentioned order of processed dimensions can be reversed.

Figure 11:
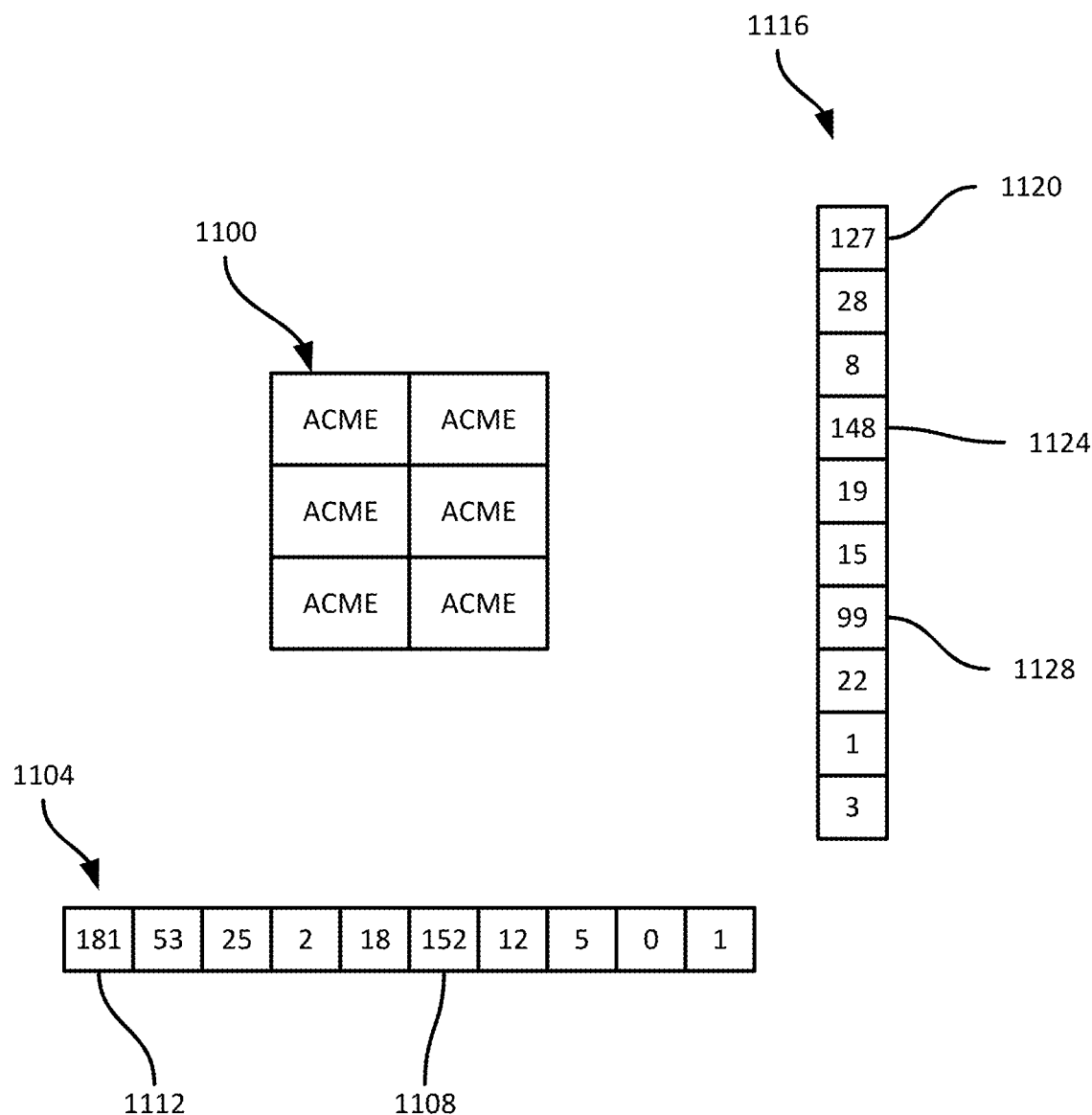
FIG. 11 is a diagram illustrating sequential performances of block 420 of the method of FIG. 4 in different dimensions.

Turning to FIG. 11, an image 1100 is shown depicting six product instances, arranged in two contiguous stacks of three items each. Via a first performance of block 420, a histogram 1104 corresponding to the horizontal dimension is generated. As will be apparent from the image 1100, a peak 1108 in the histogram 1104 corresponds to matching keypoint pairs from horizontally-spaced items in the image 1100. Further, a peak 1112 corresponds to matching keypoint pairs from vertically-spaced items in the image 1100. Such matching keypoint pairs may have small or null horizontal distances separating them. The server 101 can therefore be configured to ignore the peak 1112 (or indeed any peak below a minimum distance threshold).

Additionally, a second iteration of block 420 yields a histogram 1116, in which a first peak 1120 results from matching keypoint pairs for horizontally-spaced items (which therefore have small vertical separation distances). The peak 1120, as with the peak 1112, may be ignored. In addition, the histogram 1116 presents two peaks 1124 and 1128. To generate a total count of item instances, the server 101 may multiply a detected horizontal count (two) by a detected vertical count (three).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method by an imaging controller of detecting item facings from image sensor data, the method comprising:
   obtaining, at the imaging controller, the image sensor data corresponding to a support structure containing at least one item;
   identifying, by a feature detector of the imaging controller, a set of matched keypoint pairs from keypoints of the image sensor data;
   determining, by a peak detector of the imaging controller, a separation distance between the keypoints of each matched keypoint pair;
   detecting, by the peak detector, a count of item instances represented in the image sensor data based on the separation distances; and
   presenting item facing detection output including the count of item instances.

2. The method of claim 1, further comprising:
   obtaining point cloud data corresponding to the image sensor data;
   wherein determining the separation distance includes registering the matched keypoint pairs to the point cloud data.

3. The method of claim 1, wherein identifying the matched keypoint pairs comprises:
   generating, by the feature detector of the imaging controller, respective feature descriptors for a plurality of keypoints from the image sensor data; and
   comparing the feature descriptors.

4. The method of claim 3, wherein identifying the matched keypoint pairs further comprises, for each of a plurality of keypoint pairs:
   determining a difference metric; and
   when the difference metric is below a threshold, identifying the keypoint pair as a matched keypoint pair.

5. The method of claim 1, further comprising:
   allocating, by a boundary generator of the imaging controller, each keypoint to a cluster; and
   generating an item boundary corresponding to the cluster;
   wherein the item facing detection output includes the item boundary.

6. The method of claim 5, wherein the allocating comprises:
   assigning an affinity value to each of a plurality of pairs of the keypoints based on (i) whether the pair is a matched keypoint pair, and (ii) the separation distance between the pair.

7. The method of claim 1, wherein detecting the count of item instances comprises:
for each separation distance, incrementing a corresponding one of a set of histogram scores; and
detecting at least one peak in the set of histogram scores.

8. The method of claim 1, wherein the separation distance is a separation distance in a first physical dimension associated with the support structure.

9. The method of claim 8, further comprising:
determining, by the peak detector, a further separation distance for each matched keypoint pair in a second physical dimension associated with the support structure; and
detecting, by the peak detector, a count of item instances represented in the image sensor data based on the separation distances in the first and second physical dimensions.

10. A computing device, comprising:
a feature detector configured to:
obtain image sensor data corresponding to a support structure containing at least one item; and
identify a set of matched keypoint pairs from keypoints of the image sensor data;
a peak detector configured to:
determine a separation distance between the keypoints of each matched keypoint pair;
detect a count of item instances represented in the image sensor data based on the separation distances; and
a boundary generator configured to present item facing detection output including the count of item instances.

11. The computing device of claim 10, wherein the feature detector is further configured to:
obtain point cloud data corresponding to the image sensor data; and
in order to determine the separation distance, register the matched keypoint pairs to the point cloud data.

12. The computing device of claim 10, wherein the feature detector is configured, in order to identify the matched keypoint pairs, to:
generate respective feature descriptors for a plurality of keypoints from the image sensor data; and
compare the feature descriptors.

13. The computing device of claim 12, wherein the feature detector is further configured, in order to identify the matched keypoint pairs, to:
for each of a plurality of keypoint pairs, determine a difference metric; and
when the difference metric is below a threshold, identify the keypoint pair as a matched keypoint pair.

14. The computing device of claim 10, wherein the boundary generator is further configured to:
allocate each keypoint to a cluster; and
generate an item boundary corresponding to the cluster;
wherein the item facing detection output includes the item boundary.

15. The computing device of claim 14, wherein the boundary generator is further configured, in order to allocate each keypoint to a cluster, to:
assign an affinity value to each of a plurality of pairs of the keypoints based on (i) whether the pair is a matched keypoint pair, and (ii) the separation distance between the pair.

16. The computing device of claim 10, wherein the peak detector is further configured, in order to detect the count of item instances, to:
for each separation distance, increment a corresponding one of a set of histogram scores; and
detect at least one peak in the set of histogram scores.

17. The computing device of claim 10, wherein the separation distance is a separation distance in a first physical dimension associated with the support structure.

18. The computing device of claim 17, wherein the peak detector is further configured to:
determine a further separation distance for each matched keypoint pair in a second physical dimension associated with the support structure; and
detect a count of item instances represented in the image data based on the separation distances in the first and second physical dimensions.

19. A non-transitory computer-readable medium storing computer executable instructions that when executed by a processor cause the processor to perform the operations of:
obtaining image sensor data corresponding to a support structure containing at least one item;
identifying a set of matched keypoint pairs from keypoints of the image sensor data;
determining a separation distance between the keypoints of each matched keypoint pair;
detecting a count of item instances represented in the image sensor data based on the separation distances; and
presenting item facing detection output including the count of item instances.

20. The non-transitory computer-readable medium of claim 19, wherein the instructions further comprise:
for each separation distance, incrementing a corresponding one of a set of histogram scores; and
detecting at least one peak in the set of histogram scores.

* * * * *